July 21, 1959 — A. W. GAIR — 2,895,756
SELF-POSITIONING TIE ROD CLAMP AND TURNBUCKLE ASSEMBLY
Filed Oct. 6, 1955 — 2 Sheets-Sheet 1
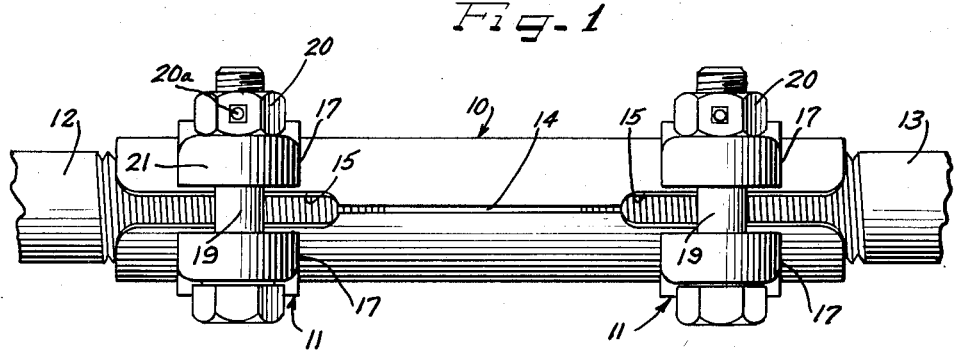
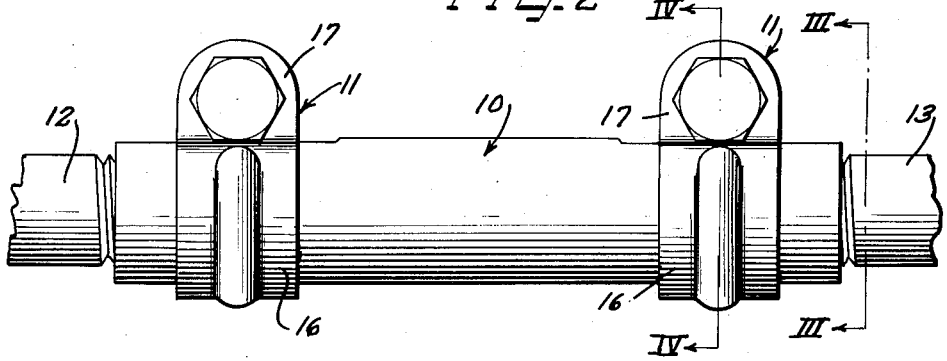
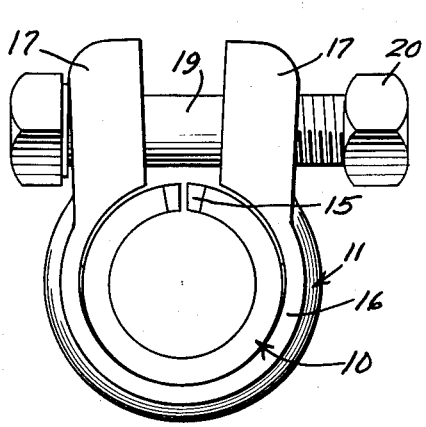
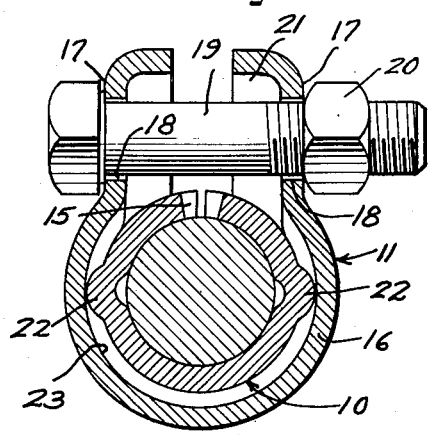
Inventor
ALBERT W. GAIR July 21, 1959 A. W. GAIR 2,895,756
SELF-POSITIONING TIE ROD CLAMP AND TURNBUCKLE ASSEMBLY
Filed Oct. 6, 1955 2 Sheets-Sheet 2
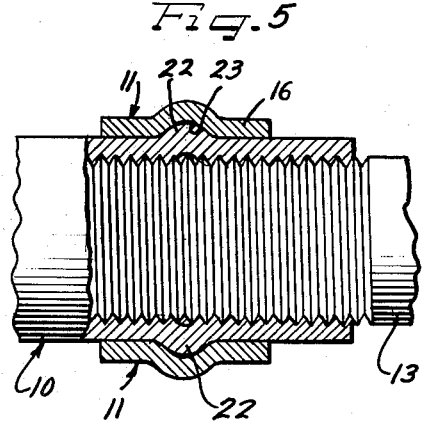
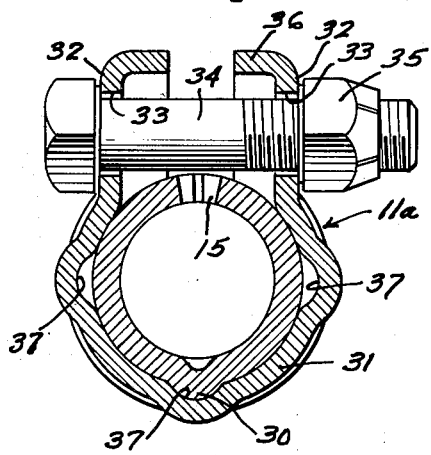
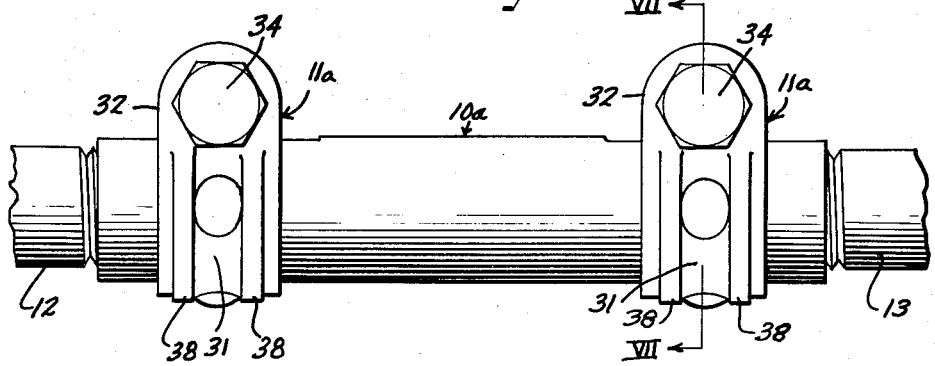
Inventor.
ALBERT W. GAIR

United States Patent Office 2,895,756
Patented July 21, 1959

2,895,756

SELF-POSITIONING TIE ROD CLAMP AND TURNBUCKLE ASSEMBLY

Albert W. Gair, Fraser, Mich., assignor to Thompson Products, Inc., Cleveland, Ohio, a corporation of Ohio Application October 6, 1955, Serial No. 538,821

3 Claims. (Cl. 287—62)

This invention relates to a clamp and tube assembly wherein clamps can be loosely mounted on a tube and held in correct position thereon to facilitate subsequent tightening of the clamps in mounting the assembly and to substantially eliminate the possibility of the clamps from becoming disengaged from the tube and being lost during shipment.

Specifically, the invention deals with an adjusting sleeve for use between a tie rod and a tie rod joint, which sleeve is equipped with outwardly protruding dimples for retaining clamps in proper longitudinal and radial position on the sleeve.

The invention will hereinafter be described as embodied in its preferred form of an adjusting sleeve for tie rod assemblies, but it should be understood that the principles of the invention are generally applicable to clamping rings and collapsible tubes acted on by the rings.

Heretofore, clamp and tube assemblies have been shipped where the clamps are absolutley loose on the tubes to facilitate positioning the clamp on the tube in the final assembly operation. However, where clamp and tube assemblies are shipped in this condition, it has been found that the clamps, the draw bolts, and the nuts and lock washers frequently rattle off the tube, become separated and lost, and cause excessive delay at the final assembly operation. Difficulty has also been encountered in the assembly of the male threaded parts with the clamp and tube assemblies for the adjustment of the assemblies at the final assembly operation where the tube and clamp assemblies are partially tightened so as not to be loose enough to separate during shipment.

According to the invention, an adjusting sleeve or tube is formed in any suitable manner such as by curling a piece of strip steel into the shape of a tube. The tube is provided with slots extending inwardly from the ends thereof so as to provide split end portions on the tube. The end portions of the tube are internally threaded, right-handed and left-handed, respectively, at the opposite ends, for receiving a threaded male part. A pair of split clamping rings having the bight portion substantially surrounding the ends of the tube and a pair of opposed legs are carried on the tube. A draw bolt and lock nut are carried by the leg of each clamping ring for tightening the ring and the respective split end portion of the tube. One or more protuberant parts, or rounded projections are formed on the outer surface of each end portion on the tube for coacting with an indentation in the bight portion of each clamping ring to hold the clamping ring against axial or rotational movement, or both, on the tube.

In the preferred embodiment the bight portion of each clamping ring is provided with an arcuate groove along the inner face thereof opening toward the outer surface of the tube end portions which coacts with the respective rounded projections to prevent axial movement of the clamping ring along the tube while allowing 360° rotational movement thereof.

In another embodiment, the bight portion of each clamping ring is provide with indentations complementally formed with the rounded projections on the tube ends which function to prevent axial and rotational movement of the clamping ring on the tube.

Accordingly, it is an object of this invention to provide a clamp and tube assembly accommodating loose mounting of clamps on a tube while retaining the clamps in proper longitudinal position relative to the tube.

A further object of this invention is to provide an adjusting sleeve having outwardly protuberant parts, or rounded projections on the end portions thereof for retaining clamping rings.

A still further object of this invention is to provide a clamp and tube assembly provided with means for preventing axial movement of the clamping ring along the tube while permitting 360° rotational movement of the clamping ring thereon.

Another object of this invention resides in the provision of a clamp and tube assembly having means to prevent axial and rotational movement of a clamping ring on the tube.

A still further object of this invention resides in the provision of a clamp and tube assembly wherein the assembly may be shipped partially assembled with the clamping rings mounted on the ends of a tube, and the danger of relative emovement between the clamping rings and tube and separation of the draw bolts, nuts and clamping rings from the tube is substantially eliminated.

Another object of this invention is to provide a clamp and tube assembly, wherein the clamping rings are axially positioned on the tube, but free to rotate therearound, and need not be tightened during shipment to the extend of interfering with the assembly of the male threaded parts or the adjustment of the linkage of the final assembly operation.

Other objects, features and advantages of the invention will be apparent from the following detailed disclosures, taken in conjunction with the accompanying sheets of drawings, wherein like reference numerals refer to like parts, in which:

On the drawings:

Figure 1 is a top plan view of an adjusting sleeve assembly, according to the invention, mounted in position between a tie rod and a tie rod end or joint;

Figure 2 is a side elevational view of the adjusting sleeve assembly in Figure 1;

Figure 3 is an end elevational view of the tube and clamp assembly, looking in the direction of the arrows on line III—III in Figure 2, with the threaded male part removed;

Figure 4 is a transverse sectional view, with parts in elevation, taken substantially along line IV—IV in Figure 2;

Figure 5 is an enlarged fragmentary view, partly in section and partly in plan taken substantially along a horizontal plane extending through the midpoint of the tube and clamp assembly at a clamping ring;

Figure 6 is a side elevation view of a modified adjusting sleeve, according to the invention, mounted in position between a tie rod and tie rod end or joint; and Figure 7 is an enlarged transverse sectional view, with parts in end elevation, taken substantially along line VII—VII in Figure 6.

As shown on the drawings:

As seen in Figure 1 a clamp and tube assembly or turnbuckle assembly is illustrated which comprises in general an adjusting sleeve, tube, or turnbuckle 10 carrying a pair of axially spaced clamping rings 11 surrounding the end portions thereof to lock the tube in adjusted position relative to a pair of axially spaced threaded male parts 12 and 13. The male threaded parts 12 and 13 may be a tie rod end or joint and a tie rod associated with the conventional steering linkage of a vehicle.

The turnbuckle barrel or tube 10 can be manufactured from seamless metal tubing or be formed from flat sheet metal by shaping a blank with the proper configuration and rolling the same into tubular shape. The finished turnbuckle barrel 10 is preferably constructed by the latter method.

The confronting edges of the rolled blank are seen to be in slightly spaced relationship, thereby forming a longitudinal slot 14. In some cases, it may be desired to fixedly secure the confronting edges to one another when they abut each other as by welding or other equivalent means. At the opposite ends of the tube 10, longitudinal or axial slots 15 are formed which open at one end to the peripheral ends of the tube and at the other end to the ends of the central slot 14. The slots 15 are in alignment with one another and with the slot 14, and of substantially greater width than the slot 14; and thereby provide the contractible end portions of the sleeve 10. These slotted ends of the tube 10 are internally threaded at one end having a right-hand thread which receives the right-hand threaded male part 13 and internally threaded at the other end having a left-hand thread receiving the left-hand threaded male part 12.

The clamps 11 which surround the slotted end portions of the tubes 10 and provide means for contracting the end portions each comprise a split annular band or bight portion 16 with a projecting leg or tab 17 on each end thereof. The legs 17 are disposed in opposed relationship and have transverse holes 18 therethrough to freely receive a clamping or draw bolt 19. The head of each bolt 19 is bottomed on one leg 17 and the threaded end of the shank projects through the other leg to receive on its projecting end a self-locking nut 20. While any suitable type of lock nut may be employed, the lock nut 20 is hexagonal in shape, and transversely bored through one hexagonal face for receiving a nylon insert or pellet 20a which is staked in place in such a manner as to engage the threaded ends of the bolts 19.

When the draw bolt 19 is tightened, the legs 17 are drawn together to contract the bight portion 16 around the end portions of the sleeve 10 thereby decreasing the width of the slots 15 and clamping the sleeve around the inserted male threaded members the confronting edges of the blank actually becoming abutting edges thereof.

In order to stiffen the clamping legs 17 against bending from the forces exerted by the draw bolt 19, each leg is provided around its periphery with an inwardly turned flange 21. These flanges extend across the free ends of the tabs and down along the sides of the legs to overlie the sleeve surrounded by the bight portion 16. Figure 3 illustrates a clamping ring 11 on a sleeve in its loose and open position, while Figure 4 shows a clamping ring 11 in tightened position on a sleeve.

To hold the clamping ring against axial movement along the tube 10, a pair of diametrally opposed rounded projections or protrusions 22 (see Fig. 4) are formed on the outer surface of each slotted end portion of the tube 10. The rounded projections 22 project outwardly from the outer surface of the slotted end portions and are each preferably spaced substantially 90° from the slot 15. The bight portion 16 of each clamp 11 is provided with a substantially annular groove or track 23 along the midsection thereof which receives the diametrally opposed rounded projections 22. It is noted that the groove 23 is open at each end as well as opening inwardly toward the outer surface of the end portions of the tube. Thus, it is seen that the clamping rings 11 are prevented from being axially displaced along the tube 10, while they are permitted to be rotated around the tube a full 360°. Also it is seen that due to the spacing of the rounded projections 22, only one of the rounded projections 22 may at any time be positioned between the legs 17 of the clamping ring, thereby precluding the even remotest possibility of axially sliding the clamping ring 11 along the tube 10. Moreover, due to the possible 360° rotation of the clamping ring 11 on the tube 10, the bight portion 16 of the clamping ring may be positioned at any angle with respect to the slot 15.

As above pointed out, the right and left hand threaded ends of the tube 10 respectively receive the right and left hand threaded ends of the male members 12 and 13. Rotation of the tube 10 thereupon varies the spacing of the end of the male member 12 from the end of the male member 13 and the sleeve 10 functions in the manner of a turnbuckle. When the desired space in between the members 12 and 13 has been achieved, the draw bolts 19 are tightened in the clamping rings 11 to contract the slotted ends of the sleeve 10 around the respective male threaded members thereby locking the sleeve against further movement relative to these members.

Now referring to Figures 6 and 7, a different form of the invention is illustrated, wherein a sleeve 10A is formed in the same manner as the sleeve 10 and provided with longitudinal end slots 15. The slotted end portions of the sleeve 10A carry clamping rings 11A which are differently construction than the clamping rings 11. The tube or sleeve 10A is also right and left hand threaded at each end to receive the right hand threaded member 13 and the left hand threaded member 12.

In this embodiment, the sleeve 10A is provided with a single rounded projection 30 formed at each slotted end portion. The rounded projection 30 projects outwardly from the outer surface of each end portion and is circumferentially spaced substantially 180° from the slot 15.

Each clamping ring 11A comprises a split annular band or bight portion 31 having a leg 32 on each end thereof. The legs 32 are in opposed relationship and have transverse holes 33 therethrough to receive freely the shank of a clamping or draw bolt 34. The head of the draw bolt 34 is bottomed on one leg 32 and the threaded end of the shank projects through the other leg 32 to receive on its projecting end a self-locking nut 35.

As in the preferred embodiment, in order to stiffen the clamping legs 32 against bending from the forces exerted by the draw bolt 34, each leg is provided around its periphery with an inwardly turned flange 36. These flanges extend across the free ends of the legs and down along the sides of the legs to overlie the tubes surrounded by the bight portion 31.

When the draw bolt 34 is tightened, the legs 32 are drawn together to contract the ring bight portion 31 around the end portions of the sleeve 10A thereby decreasing the width of the slot 15 and clamping the sleeve around the inserted threaded member.

To coact with the rounded projection 30 on the tube 10A for axially and rotationally positioning the clamping rings 11A on the end portions of the tube, a plurality of circumferentially spaced indentations 37 opening toward the outer surface of the tube end portions are provided along the bight portion 31 of the clamping rings. While the indentations 37 may be circumferentially spaced along the bight portion of the clamping ring in any manner, it is preferable that three indentations are provided circumferentially spaced 90° from each other and from the split section of the clamping ring. Thus, the clamping ring may be positioned on the slotted end of the tube so that the central point of the bight portion 31 is diametrically opposed to the slot 15 or circumferentially spaced 90° from either side thereof. Hence, it is seen that this embodiment provides a tube and clamping assembly which enables the clamping rings to be held on the end portions of the sleeve against axial and rotational displacement. In order to strengthen the bight portion 31 of the clamping rings 11A, a pair of axially spaced outstanding ribs 38 are provided on the outer surface thereof.

The operation of the embodiment illustrated in Fig-

I claim as my invention:

1. An adjusting sleeve and clamp adapted for connecting a tie rod with a tie rod joint comprising a split tube having adjacent edges of the main portion thereof slightly spaced apart and having a longitudinally slotted internally threaded end portion, the longitudinal adjacent edges of the end portion being spaced apart a greater distance than the adjacent edges of said main portion, a clamping ring surrounding said slotted end portion and having an annular bight portion with an embossment opening toward the outer surface of said split tube together with a pair of outturned legs adapted to receive a draw bolt to contract the bight portion, a clamping ring retainer protuberance on said end portion of the tube projecting into the embossment of the annular bight portion to hold the ring against axial movement on the tube and said legs when drawn together contracting said bight portion and said tube to bring the adjacent edges of the main tube portion and the end portion closer together.

2. A tube and clamp assembly comprising a tube having a circumferentially contractible portion, a clamp surrounding said portion including a ring with a bight portion seated on and partially surrounding said contractible tube portion, spaced opposed outturned legs on the ends of said bight portion, said bight portion having a gap between said legs, a draw bolt assembly bridging said gap and extending through the legs outwardly from said bight portion to draw the legs together for decreasing the gap and contracting the bight portion to contract the contractible portion of the tube, said clamp in its expanded position being freely rotatable on the tube to position the legs thereof at any desired circumferential portion of the tube, said bight portion having an internal circumferential groove open at the ends thereof to said gap between the ends of the bight portion and providing spaced opposed abutment walls along the length thereof, a pair of dimples in the contractible portion of the tube spaced circumferentially apart at a distance greater than the width of said gap and providing protuberances freely fitting in the groove of said bight portion to be abutted by said abutment walls for holding the clamp against axial shifting on the tube while accommodating free rotation of the clamp on the tube, and at least one protuberance always being seated in said groove regardless of the position of the gap relative to the tube.

3. A tube and clamp assembly comprising a split tube having at least one contractible end portion, a clamping ring surrounding said contractible end portion of the tube and having an annular bight portion with a gap between the ends thereof, a pair of opposed outwardly extending clamping legs on said bight portion adapted to be drawn together to reduce the gap and contract the bight portion for tightening the ring on the tube to contract the contractible end portion of the tube, said annular bight portion having an embossment providing a circumferential groove opening toward the outer surface of the tube and having circumferential abutment walls, and a plurality of dimples in said tube forming protuberances adapted to extend into said groove to coact with the abutment walls thereof for restraining said ring at least against longitudinal movement on the tube, and said protuberances being spaced circumferentially around the tube at a distance greater than the width of the gap so that one protuberance is always abutted by said abutment walls regardless of the position of the gap relative to the tube.

References Cited in the file of this patent

UNITED STATES PATENTS

| | | |
|---|---|---|
| 390,992 | Stillman | Oct. 9, 1888 |
| 823,591 | Eager | June 19, 1906 |
| 1,296,318 | Riggs | Mar. 4, 1919 |
| 2,426,423 | Woolsey | Aug. 26, 1947 |
| 2,526,470 | Gauthier | Oct. 17, 1950 |
| 2,696,397 | Booth | Dec. 7, 1954 |